(12) United States Patent
Stephens

(10) Patent No.: US 10,824,605 B2
(45) Date of Patent: Nov. 3, 2020

(54) DATABASE METADATA AND METHODS TO ADAPT THE SAME

(71) Applicant: AT&T Intellectual Property I, L.P., Atlanta, GA (US)

(72) Inventor: Robert Todd Stephens, Fayetteville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 16/241,409

(22) Filed: Jan. 7, 2019

(65) Prior Publication Data
US 2020/0218703 A1 Jul. 9, 2020

Related U.S. Application Data

(63) Continuation of application No. 15/075,092, filed on Mar. 18, 2016, now abandoned.

(51) Int. Cl.
| | |
|---|---|
| *G06F 16/00* | (2019.01) |
| *G06F 16/21* | (2019.01) |
| *G06F 11/07* | (2006.01) |
| *G06F 16/22* | (2019.01) |
| *G06F 16/215* | (2019.01) |

(52) U.S. Cl.
CPC .......... *G06F 16/213* (2019.01); *G06F 11/076* (2013.01); *G06F 16/215* (2019.01); *G06F 16/2282* (2019.01)

(58) Field of Classification Search
CPC .... G06F 11/076; G06F 16/215; G06F 16/213; G06F 16/2282
See application file for complete search history.

(56) References Cited

U.S. PATENT DOCUMENTS

| | | | |
|---|---|---|---|
| 7,725,431 B2 | 5/2010 | Myllyla et al. | |
| 7,925,638 B2* | 4/2011 | Sengupta | G06Q 40/00 707/690 |
| 7,933,934 B2* | 4/2011 | Sengupta | G06Q 10/06 707/806 |
| 7,979,477 B2 | 7/2011 | McCormack et al. | |

(Continued)

OTHER PUBLICATIONS

Mark R. Dambro, M.D., and Barry D. Weiss, M.D., "Assessing the Quality of Data Entry in a Computerized Medical Records System ", Journal of Medical Systems, vol. 12, No. 3, 1988, Plenum Publishing, pp. 181-187. (Year: 1988).*

(Continued)

*Primary Examiner* — Cheryl Lewis

(74) *Attorney, Agent, or Firm* — Hartman & Citrin LLC

(57) ABSTRACT

Database metadata and methods to adapt the same are disclosed. An example method includes determining, by executing a first instruction with a processor, a first database field pattern assigned to a field of a database, the first database field pattern assigned to the field via metadata for the database, determining, by executing a second instruction with the processor, an error rate of the data for the field with the first database field pattern, and in response to determining that the error rate meets a threshold: identifying, by executing a third instruction with the processor, a second database field pattern that matches the data; and modifying, by executing a fourth instruction with the processor, the metadata to assign the second database field pattern to the field.

20 Claims, 6 Drawing Sheets

(56) References Cited

U.S. PATENT DOCUMENTS

| | | |
|---|---|---|
| 8,131,749 B2 | 3/2012 | Sayfan |
| 8,738,663 B2 | 5/2014 | Gonzalez et al. |
| 9,047,344 B2 | 6/2015 | Brannon et al. |
| 2005/0267913 A1 | 12/2005 | Stienhans et al. |
| 2009/0319556 A1 | 12/2009 | Stolte et al. |
| 2010/0299314 A1 | 11/2010 | Sengupta et al. |
| 2011/0295864 A1 | 12/2011 | Betz et al. |
| 2012/0226658 A1 | 9/2012 | Connor |
| 2013/0018873 A1 | 1/2013 | Velasco |
| 2014/0181056 A1 | 6/2014 | Pidduck |
| 2015/0081717 A1 | 3/2015 | Pidduck |
| 2015/0100546 A1 | 4/2015 | Eberlein et al. |
| 2015/0178396 A1 | 6/2015 | Hnatio |
| 2015/0213043 A1 | 7/2015 | Ishii et al. |
| 2015/0347493 A1 | 12/2015 | Namkoong et al. |
| 2017/0270154 A1 | 9/2017 | Stephens |

OTHER PUBLICATIONS

United States Patent and Trademark Office, "Non-Final Office Action," issued in connection with U.S. Appl. No. 15/075,092, dated Mar. 1, 2018, 11 pages.

United States Patent and Trademark Office, "Final Office Action," issued in connection with U.S. Appl. No. 15/075,092, dated Sep. 6, 2018, 13 pages.

\* cited by examiner

DATABASE METADATA AND METHODS TO ADAPT THE SAME

CROSS-REFERENCE TO RELATED APPLICATIONS

This patent arises from a continuation of U.S. patent application Ser. No. 15/075,092, which is entitled "METHODS AND APPARATUS TO MANAGE DATABASE METADATA," which was filed on Mar. 18, 2016, and which is now abandoned. U.S. patent application Ser. No. 15/075,092 is hereby incorporated herein by reference in its entirety. Priority to U.S. patent application Ser. No. 15/075,092 is hereby claimed.

BACKGROUND

Metadata is data that describes other data. Metadata summarizes basic information about data, which can make finding and working with particular instances of data easier. For example, author, date created, date modified, and file size are examples of basic document metadata. Having the ability to filter through that metadata makes it much easier for someone to locate a specific document. Metadata may be utilized to describe data in a file system, data in a database, data in a webpage, etc.

Metadata can be created manually or by automated information processing. Manual creation tends to be more accurate, allowing the user to input any information they feel is relevant or needed to help describe the file. Automated metadata creation can be much more elementary, usually only displaying information such as file size, file extension, when the file was created, and who created the file.

DETAILED DESCRIPTION

While data may change over time, metadata is typically stored in a relatively static manner. For example, metadata describing the fields in a database may be created when the database is first designed. Due to the effort required in reassigning the metadata to fields in the database, the metadata may only be infrequently updated.

Figure 1:
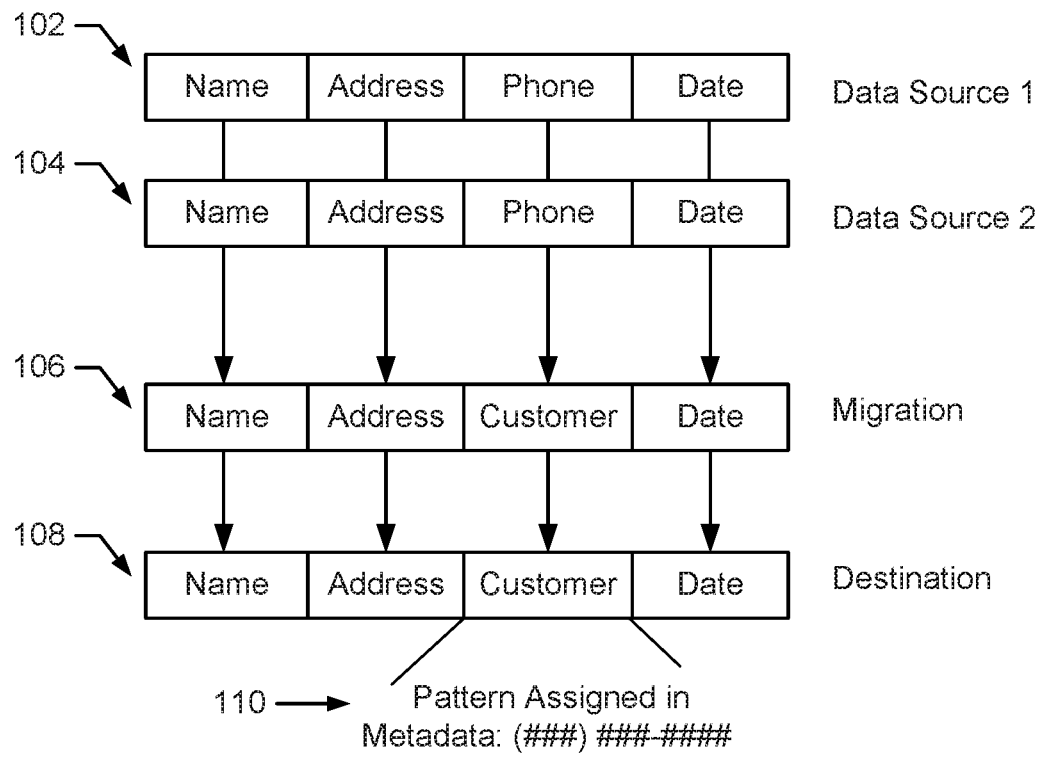
FIG. 1 illustrates a transformation process of transferring data from a first and second data source to a destination database at a first time.

For example, FIG. 1 illustrates an example Extract, Transform, and Load (ETL) transformation process. According to the illustrated example, a first record 102 and a second record 104 have the following fields: Name, Address, Phone, and Date. According to the illustrated example of FIG. 1, those records are transformed to migration records 106 having the following fields: Name, Address, Customer, Date, where like-fields are transferred to like-fields and Phone is inserted into a Customer field (e.g., a field to uniquely identify customers). The migration records 106 are then loaded into destination records 108 having the following fields: Name, Address, Customer, Date. An example pattern 110 is assigned to the Customer field in the destination records 108 in the metadata for the destination records 108. The example pattern indicates that input data in the Customer field should be three digits surrounded by parenthesis, followed by a space, followed by three digits, followed by a hyphen, and following by four digits. Accordingly, when the Phone field in the first record 102 and/or the second record 104 are properly populated with valid phone numbers, the phone numbers match the assigned example pattern 110. If the phone field is populated with another value (e.g., because a user has entered only a five-digit extension for a phone number), the value will not match the assigned example pattern 110 and an error may be reported (e.g., by a monitoring agent monitoring the destination records 108).

Figure 2:
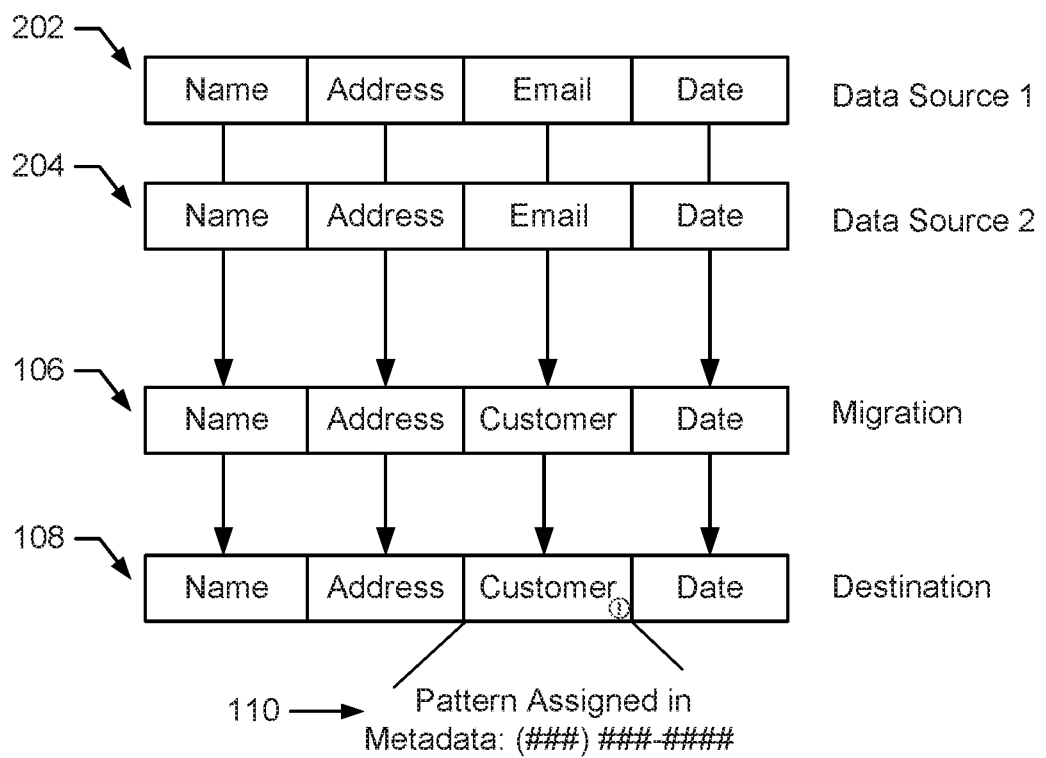
FIG. 2 illustrates another transformation process of transferring data from the first and second data source to the destination database at a second time.

The example of FIG. 2 illustrates an example of the ETL transformation process of FIG. 1 at a later time. According to the illustrated example, as time has passed, the entity(ies) that owns the data input to the ETL has decided to utilize the field previously storing Phone with an electronic mail address. Accordingly, an example third record 202 and an example fourth record 204 include the following fields: Name, Address, Email, Date. When the ETL transformation process is performed, the Email field from the third record 202 and the fourth record 204 is inserted into the Customer field of the example migration records 106. Thus, when the migrations records 106 are loaded into the example destination records 108, the Customer field of the destination records 108 will include the email addresses from the Email fields of the third record 202 and the fourth record 204. Accordingly, because the metadata for the destination records 108 stores the example pattern 110 that is associated with a phone number, the ones of the destination records 108 that include an email address in the Customer field (e.g., ones of the destination records 108 that were developed from records after the entity managing the third record 202 and the fourth record 204 has changed to storing the email address instead of the phone number) will be flagged as an error (e.g., an error indicating that the data is in error).

As shown by the examples of FIGS. 1 and 2, in some instances, the data for a database (e.g., data collected by an ETL transformation process or any other data) may change over time. While it is common that some data inputs may not match metadata assigned to the data (e.g., a metadata pattern identifying valid data for a field) and should be flagged as an error, in some examples, data discrepancies may be indicative of a change in the data that is not an error.

Methods and apparatus disclosed herein facilitate adapting metadata to changing conditions. For example, by monitoring data inputs to a database and identifying a trending change (e.g., as opposed to ephemeral changes, typographical errors in data inputs, etc.), the disclosed methods and apparatus automatically change metadata to adapt to the trending change. In some examples disclosed herein, data inputs are compared with the data patterns assigned to the fields in which the data is input. When a sufficient error level is detected (e.g., when 25% of data inputs to an analyzed field do not match the assigned data patterns), the metadata may be analyzed for possible adaptation. For example, a recent window of data inputs for the analyzed field (e.g., the most recent 10% of records) may be compared with a table of possible data patterns (e.g., a table of data patterns that includes the data pattern assigned to the analyzed field). If the example analysis identifies that a data pattern not assigned to the analyzed field is more prevalent in the windows of data inputs, the identified data pattern is assigned to the analyzed field to replace original pattern in the metadata. Accordingly, disclosed methods and apparatus facilitate automatic adjustment of metadata to adapt to changing conditions.

Example methods, apparatus, systems and articles of manufacture disclosed herein manage data patterns in metadata to automatically adapt to changing data. In some examples, the data patterns in the metadata may be automatically learned (e.g., without requiring an administrator to initially set the data patterns).

Figure 3:
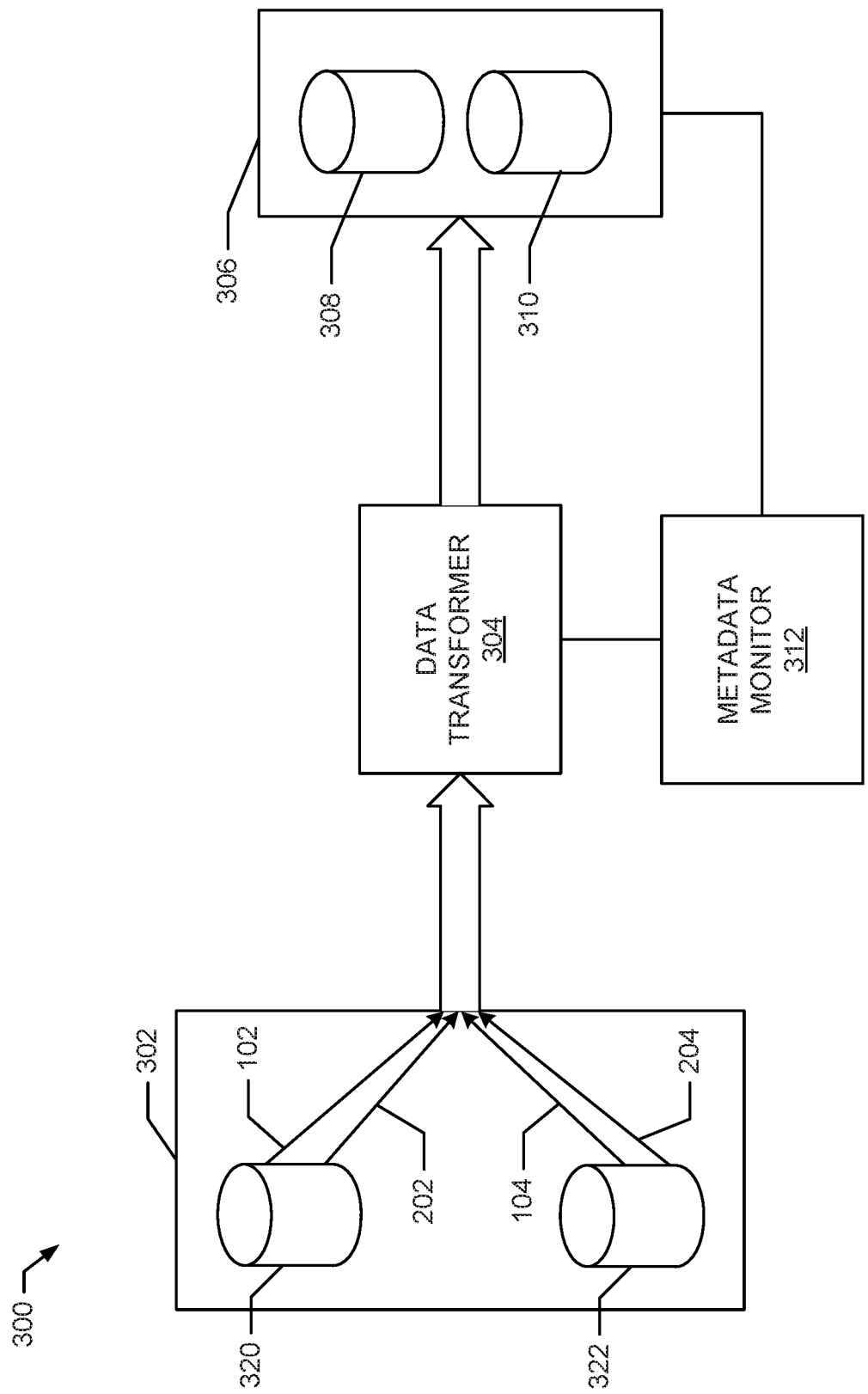
FIG. 3 is a block diagram of an example environment in which an example metadata monitor monitors data input to a destination database to monitor metadata associated with the destination database.

FIG. 3 illustrates an example ETL environment 300 in which an example source data 302 is transformed by an example data transformer 304 and loaded into a destination datastore 306. The example environment 300 includes an example metadata monitor 312 to monitor the metadata associated with the example destination datastore 306, to determine if the metadata (e.g., a pattern or definition associated with a field of the data) matches the data input from the example source data 302, and to adjust the metadata when the data input from the example source data 302 does not match metadata.

The example source data 302 includes an example first database 320 and an example second database 322. According to the illustrated example, the example first database 320 and the example second database 322 are databases hosted by two different third parties (e.g., clients of the owner of the example destination datastore 306, customers of the owner of the example destination datastore 306, data providers for the owner of the example destination datastore 306, etc.). Alternatively, the first database 320 and the example second database 322 may be hosted by the same entity (e.g., one third party entity or the owner of the destination datastore 306, etc.). Additionally or alternatively, the first database 320 and the second database 322 may be the same or different types of data storage (e.g., file(s), database(s), clustered data storage, etc.). While two databases are shown in the illustrated example, the source data 302 may include any number of databases (e.g., 1, 2, 5, 20, 100, 1000, etc.). For example, the source data 302 may collectively include a large number of records (e.g., thousands of records, millions of records, tens of millions of records, etc.).

According to the illustrated example, the example first database 320 provides the example first record 102 of FIG. 1 and the example third record 202 of FIG. 2 to the example data transformer 304 and the example second database 322 provides the example second record 104 of FIG. 1 and the example fourth record 204 of FIG. 2 to the example data transformer 304. For example, the first database 320 and the second database 322 may be customer records databases hosted by two different entities from which the owner of the destination datastore 306 desires to collect and combine records. For example, the owner of the destination datastore 306 may wish to merge the customer records to generate reports about the combined activity.

The example data transformer 304 of FIG. 3 performs an ETL process to extract data from the example source data 302, transform the data (e.g., modify records in the data, adjust the fields of the records, change the format of records and/or fields, merge data from different data sources, merge records, filter records, split records, transpose rows and columns in the data, etc.), and load the data into the destination datastore 306. According to the illustrated example, the example data transformer 304 and the example destination datastore 306 are hosted by the same entity (e.g., a data warehouse that manages the ETL process and the destination datastore 306). Alternatively, the data transformer 304 may be managed by a different entity (e.g., an entity that hosts one or more of the databases 320, 322 in the source data 302, another entity, etc.). For example, the example data transformer 304 may be hosted by an independent entity that manages the ETL process but does not host any of the source data 302 or the destination datastore 306. While a single data transformer 304 is illustrated in FIG. 3, the example data transformer 304 may be implemented by a plurality of computing devices that perform the ETL process (e.g., a cluster of data warehouse servers that are programmed to perform the ETL process).

The example data transformer 304 is communicatively coupled to the example source data 302, the example destination datastore 306, and the example metadata monitor 312. For example, the data transformer 304 may be coupled to one or more networks that couple the data transformer 304 to one or more of the example source data 302, the example destination datastore 306, and the example metadata monitor 312. The one or more networks may include local area networks, wide area networks, combinations of local and wide area networks, wireless networks, wired networks, etc. Additionally or alternatively, the example data transformer 304 may be coupled to one or more of the example source data 302, the example destination datastore 306, and the example metadata monitor 312 via a direct connection (e.g., the data transformer 304 may be implemented in a processor-based computing device that includes one or more of the example source data 302, the example destination datastore 306, and the example metadata monitor 312).

The destination datastore 306 of the illustrated example includes an example destination database 308 and an example metadata repository 310. The example destination datastore 306 is communicatively coupled with the example data transformer 304 to receive the data loaded into the example destination database 308 from the example ETL process of the data transformer 304 In addition, the destination datastore 306 is communicatively coupled with the example metadata monitor 312 to enable the example metadata monitor 312 to read and/or modify the contents of the example metadata repository 310 and/or the example destination database 308. While a single destination database 308 and a single metadata repository 310 are illustrated in FIG. 3, the example destination datastore 306 may alternatively include any number of databases and/or metadata repositories. In addition, the example destination database 308 and the example metadata repository 310 may be implemented in a single database.

The example destination database 308 is a database that stores the records loaded into the destination database 308 by the example data transformer 304. Alternatively, the example destination database 308 may be any other type of data storage (e.g., a file, multiple databases, etc.). The example metadata repository is a database that stores information about the data stored in the example destination database 308. According to the illustrated example, the metadata repository stores a data pattern for a field in the database. A data pattern may be a rule about the data to be stored in the field, a definition of the data to be stored in the field, a format of the data to be stored in the field, etc. For example, the data pattern may be specified by a set of characters (e.g., a regular expression) indicative of the data to be stored in the field (e.g., a "#" to indicate a number value, an "A" to indicate a letter value, etc. (e.g., ### AAA to indicate a value that is formatted as three numeric characters followed by three letter values)). In another example, the data pattern may be specified by a rule or set of rules (e.g., the metadata for a field may indicate that the contents of the field: Has no spaces, Is ten bytes long, Is all numeric, is greater than 1000000000, and is less than 9999999999). The metadata for a field may be specified (e.g., associated with the field in the metadata repository 310) by reference to a pattern identified in a set of predetermined patterns. Additionally or alternatively, the metadata for a field may be specified in detail (e.g., the rules for the field in the destination database 308 may be stored in a record associated with the field in the metadata repository 310).

The example metadata monitor 312 of the illustrated example monitors data passing through the example data transformer 304 to detect data loaded into the destination database 308 that does not match the pattern associated with the respective fields in the destination database 308 as indicated in the example metadata repository 310. According to the illustrated example, the metadata monitor 312 is communicatively coupled with the example data transformer 304 to monitor the data as it is transformed and loaded into the example destination database 308. Alternatively, the metadata monitor 312 may analyze the data with respect to the assigned patterns at any other time or location. For example, the metadata monitor 312 may analyze data stored in the destination database 308.

According to the illustrated example, when the metadata monitor 312 detects that a sufficient number of records do not match an assigned data pattern for the field into which the records are input in the destination database 308, the metadata monitor 312 performs a metadata analysis to determine if the pattern assigned in the metadata should be updated. For example, the metadata monitor 312 may detect a pattern mismatch when the example third record 202 and/or the example fourth record 204 are processed by the example data transformer 304 because the data fields have been changed such that the pattern 110 assigned to the Customer field does not match the email addresses stored in the Email field of the example third record 202 and/or the example fourth record 204.

When a threshold of pattern mismatches is detected for a field (e.g., a threshold number (e.g., 100, 1000, 10000), a threshold percent (e.g., 10%, 50%, 90%, etc.), the example metadata monitor 312 analyzes the data in the field in the example destination database 308 to determine if the metadata should be changed. The metadata monitor 312 of the illustrated example compares the data in the field in the destination database 308 to a set of patterns (e.g., a predetermined list of patterns) to determine the number of matches for each pattern. For example, the list of patterns may include a pattern associated with a phone number, a pattern associated with an email address, a pattern associated with an account number, etc. The example metadata monitor 312 determines if the percent of records matching the assigned pattern (e.g., the phone number pattern 110) is less than the percent of records matching a different pattern (e.g., an email address pattern). The example metadata monitor may then modify the metadata in the example metadata repository to assign the different pattern to the field.

Figure 4:
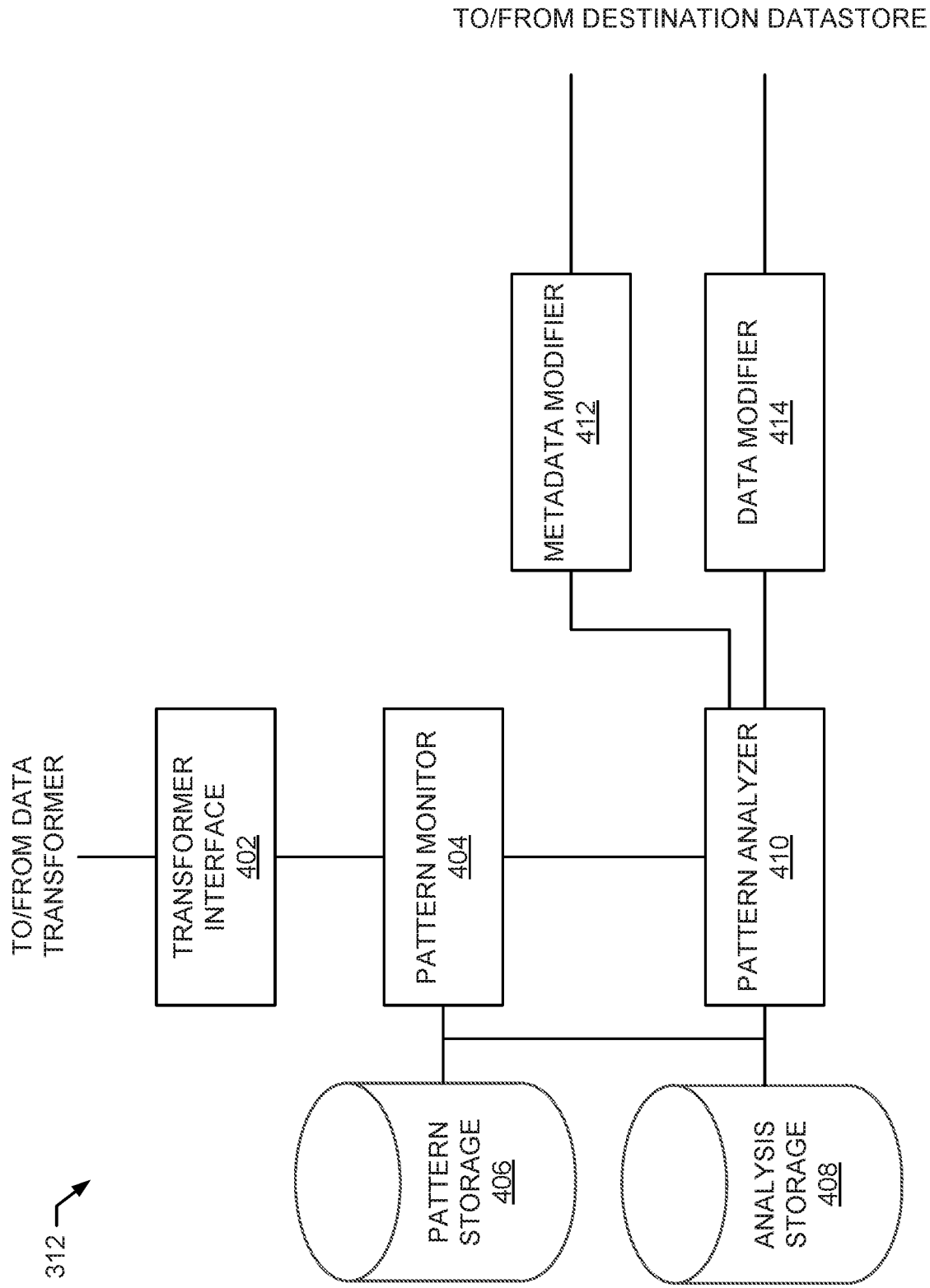
FIG. 4 is a block diagram of an example implementation of the example metadata monitor of FIG. 3.
Figure 5:
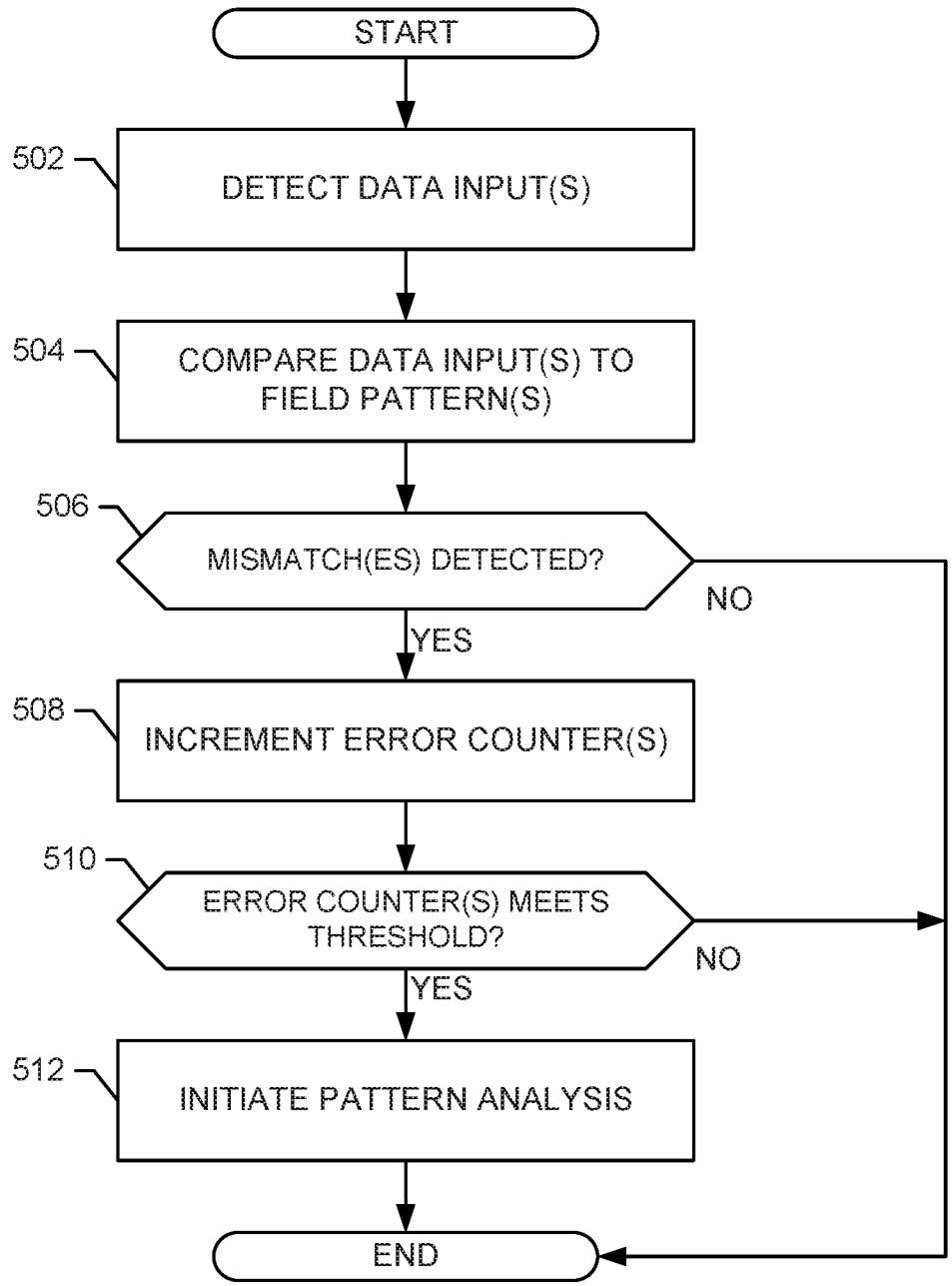
FIGS. 5 and 6 are flowcharts representative of example machine readable instructions that may be executed to example metadata monitor of FIG. 3 and/or FIG. 4.
Figure 6:
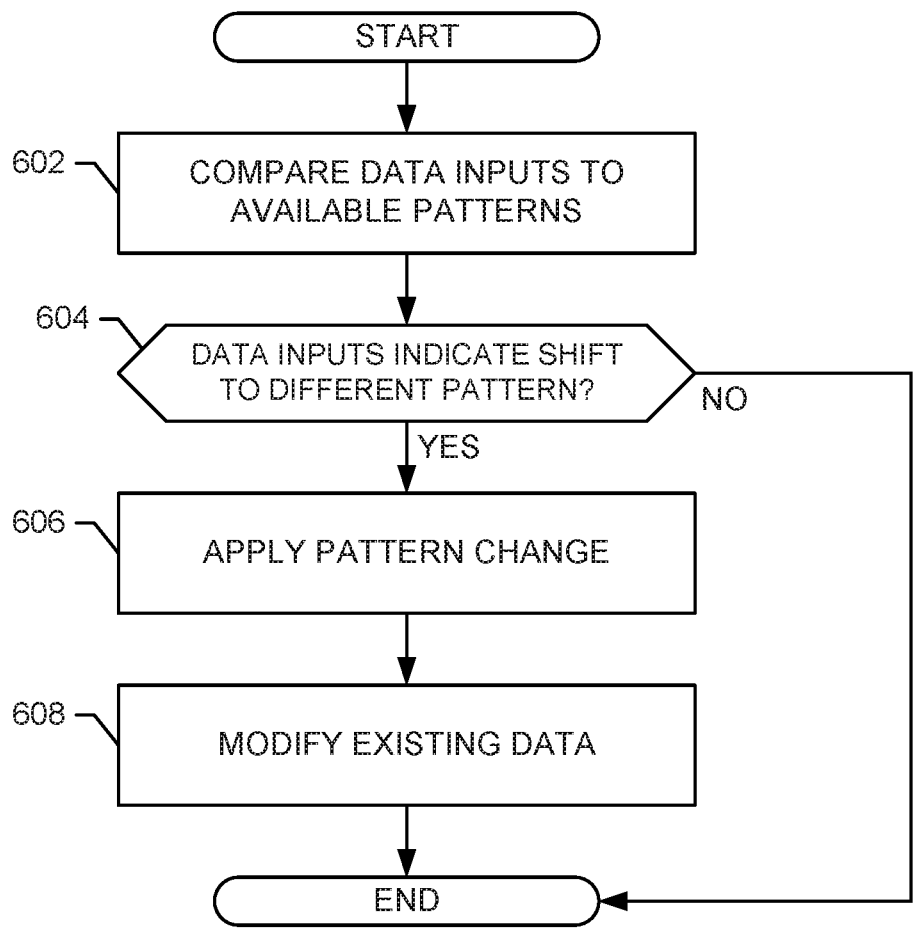

The components and operation of the example metadata monitor 312 are described in further detail in conjunction with the block diagram of FIG. 4 and the flowcharts of FIGS. 5 and 6.

While the example environment 300 of FIG. 3 illustrates an ETL process, the metadata monitor 312 may be utilized in other environments. For example, the metadata monitor 312 may monitor the metadata of a database (e.g., the example destination database 308) by performing an analysis of the data stored in the database (e.g., when the database is not utilized with an ETL process). Additionally or alternatively, the metadata monitor 312 may monitor any type of data input to the destination database 308 (e.g., data input by a user and/or an application that accesses the database).

While the examples disclosed herein utilize metadata that includes patterns for data in a field in the destination database 308, any other type of metadata may be monitored, analyzed, and/or adjusted. For example, the metadata may identify a type of field (e.g., a String field, an Integer field, an array field, etc.).

FIG. 4 is a block diagram of an example implementation of the metadata monitor 312 of FIG. 3. The example metadata monitor 312 of FIG. 4 includes an example transformer interface 402, an example pattern monitor 404, an example pattern storage 406, an example analysis storage 408, an example pattern analyzer 410, an example metadata modifier 412, and an example data modifier 414.

The transformer interface 402 of the illustrated example monitors the example data transformer 304 to detect data that is loaded (or to be loaded) into the example destination database 308. According to the illustrated example, the transformer interface 402 is communicatively coupled to the example data transformer 304 via a network connection and the example data transformer 304. Alternatively, the transformer interface 402 may be communicatively coupled to the example data transformer 304 via a direct connection or any other type of connection. Additionally or alternatively, the transformer interface 402 may monitor the data for the destination database 308 by extracting data from the example destination database 308, by monitoring data input to the example destination database 308, by periodically and/or aperiodically scanning the data in the destination database 308, etc. The example transformer interface 402 transmits retrieved/collected data to the example pattern monitor 404 for analysis.

The example pattern monitor 404 compares the retrieved/collected data to a pattern assigned to the field in which the data is to be stored/is stored. The example pattern monitor 404 retrieves the identification of the pattern for the field from the example pattern storage 406. Alternatively, the pattern monitor 404 may be communicatively coupled with the example metadata repository 310 to determine a pattern associated with the field. The example pattern monitor 404 determines if the data matches the pattern associated with the field and tracks the result. According to the illustrated example, the pattern monitor 404 increments counters stored in the example analysis storage to track the number of times that the data matches the pattern or does not match the pattern. While the example pattern monitor 404 of the illustrated example analyzes the data, in some examples the pattern monitor 404 may receive notifications from the example data transformer 304 and/or the example destination datastore 306 when the data does not match the pattern associated with the field in which the data is to be inserted/is inserted. For example, the destination datastore 306 may be configured to detect when data inserted into the destination database 308 does not match a pattern associated with the field in which the data is inserted (e.g., by reference to a pattern assigned to the field in the metadata repository 310).

The example pattern monitor 404 determines if a number of detected errors meets a threshold to trigger a metadata analysis. The example pattern monitor 404 determines if an error rate (e.g., the number of errors divided by the number of records inserted into a database) meets the threshold (e.g., is greater than, is greater than or equal to) a threshold (e.g., 10%, 25%, 50%, etc.). Alternatively, the example pattern monitor 404 may determine the error rate in any other manner (e.g., determining when a sufficient number of errors have been identified (e.g., 100 errors, 1000 errors, 10000 errors, etc.). The pattern monitor 404 may determine a separate error rate for each field in the destination database 308, may determine a collective error rate across all fields of the destination database 308, etc. When the example pattern monitor 404 determines that the errors meet a threshold, the pattern monitor 404 triggers the pattern analyzer 410 to perform a metadata pattern analysis.

The example pattern monitor 404 may employ a machine learning algorithm to detect instances of data transition (e.g., an occurrence of a data field changing to data of a new pattern) as opposed to instances of errors (e.g., where the data includes instances of inputs not matching a field pattern (e.g., errors) but the data does not transition or shift to a new pattern). For example, in an example in which the pattern monitor 404 employs a supervised machine learning algorithm (e.g., a classification tree, a regression tree, a discriminant analysis classifier, a k-nearest neighbor classifier, a Naïve Bayes classifier, a support vector machine classifier, etc.), the pattern monitor 404 may be trained on data sets that have been classified as including a data transition (e.g., an occurrence of a data field changing to data of a new pattern) or not including a data transition (e.g., where the data includes instances of inputs not matching a field pattern (e.g., errors) but the data does not transition or shift to a new pattern). After the supervised machine learning algorithm is trained, the pattern monitor 404 utilizes the trained machine learning algorithm to classify instances indicative of a data transition in which a metadata analysis is triggered. For example, the training and the analysis may employ a sliding window analysis that analyzes a most recently received window of data inputs to determine if a data transition is predicted to trigger a metadata analysis.

The example pattern storage 406 and the example analysis storage 408 are databases. Alternatively, the pattern storage 406 and/or the analysis storage 408 may be implemented by any other type of data structure such as a file(s), a storage disk(s), a network connected storage(s), etc. The example pattern storage 406 stores an association of patterns with fields of the example destination database 308 (e.g., replicates the pattern portion of the metadata stored in the metadata repository 310) and stores a list of predetermined patterns (e.g., a list of data patterns known to the entity that manages the example metadata monitor 312). The example analysis storage 408 stores counters that track the errors, error rate, and/or total records processed for determining when a pattern analysis is to be performed.

The example pattern analyzer 410 performs an analysis of patterns identified in metadata when triggered by the example pattern analyzer 410. According to the illustrated example, the pattern analyzer 410 determines which field(s) has triggered the pattern analysis based on the counters stored in the example analysis storage 408 and analyzes the field(s) to determine a frequency with which data in the field in the destination database 308 matches each pattern in a set of predetermined patterns stored in the example pattern storage 406. For example, pattern analyzer 410 may determine a first percentage of records in which the field matches a first data pattern, a second percentage of records in which the field matches a second data pattern, and a percentage of records in which the field matches a third data pattern. The example pattern analyzer 410 compares the results for each pattern to determine if the metadata should be adjusted. For example, if the first pattern (which is currently associated with the field in the metadata repository 310) is matched 30% of the time but the second pattern is matched 45% of the time, the pattern analyzer 410 determines that the field should now be associated with the second pattern (e.g., because the entity that manages the first database 320 has spontaneously changed the type data stored in a field).

The example pattern analyzer 410 performs the pattern analysis on the entirety of the data stored in the example destination database 308. Additionally or alternatively, the pattern analyzer 410 may utilize a different technique. For example, the pattern analyzer 410 may analyze a window of records (e.g., the most recent 25%, the most recent 10,000 records, etc.) In another example, the pattern analyzer 410 may utilize a machine learning algorithm (e.g., a supervised or unsupervised algorithm) to determine which pattern should be associated with a field. In another example, pattern analyzer 410 may utilize a trend analysis to determine if a shift in the data has occurred (e.g., as opposed to temporary/transient errors).

For example, in an example in which the pattern analyzer 410 employs a supervised machine learning algorithm (e.g., a classification tree, a regression tree, a discriminant analysis classifier, a k-nearest neighbor classifier, a Naïve Bayes classifier, a support vector machine classifier, etc.), the pattern analyzer 410 may be trained on data sets that have been classified with an indication of the correct field pattern (e.g., classifying the data as belonging to a particular field pattern from a list of field patterns). After the supervised machine learning algorithm is trained, the pattern analyzer 410 utilizes the trained machine learning algorithm to classify a data set (e.g., a set of data stored in a particular field) as belonging to a particular field pattern. For example, the training and the analysis may employ a sliding window analysis that analyzes a most recently received window of data inputs to determine a field pattern (e.g., in instances in which it is desired for the field pattern to more quickly transition to a currently used field pattern). The foregoing description of a supervised machine learning algorithm approach is provided as an example as other types of supervised and/or unsupervised machine learning algorithms (or other types of analysis) may be utilized.

When the example pattern analyzer 410 determines that the metadata is to be adjusted, the example pattern analyzer 410 triggers the metadata modifier 412 to update the metadata in the example metadata repository 310 and/or the example data modifier 414 to update the data stored in the example destination database 308.

The example metadata modifier 412 is communicatively coupled with the example metadata repository 310 to adjust the metadata when the example pattern analyzer 410 triggers a metadata update. For example, when the example pattern analyzer 410 determines that the data for a field has transitioned to a new field pattern (transitioned from a previous field pattern associated with the field in the metadata of the example metadata repository 310), the metadata modifier 412 associates the new field pattern with the field (e.g., the field of the destination database 308) in a record in the metadata repository 310. For example, in examples in which the metadata repository 310 stores a reference to a field pattern in a field pattern record for each field of the example destination database 308, the metadata modifier 412 replaces the stored reference with a reference to the new field pattern for the field identified by the pattern analyzer 410.

The example data modifier 414 is communicatively coupled with the example destination database 308 to adjust the database data metadata when the example pattern analyzer 410 triggers a data update. For example, when the example pattern analyzer 410 determines that the data for a field has transitioned to a new field pattern (transitioned from a previous field pattern associated with the field in the metadata of the example metadata repository 310), the example data modifier 414 moves data matching the previous field pattern to a different field (e.g., a newly created field or an existing field). Additionally or alternatively, the data modifier 414 may move data matching the new field pattern to a new field or an existing field (e.g., in an example in which the metadata modifier 412 does not change the field pattern for the analyzed field). In some examples, the data modifier 414 may not modify the data when a field pattern transition is detected and/or the metadata monitor 312 may, in some examples, not include the data modifier 414.

While an example manner of implementing the metadata monitor 312 of FIG. 3 is illustrated in FIG. 4, one or more of the elements, processes and/or devices illustrated in FIG. 4 may be combined, divided, re-arranged, omitted, eliminated and/or implemented in any other way. Further, the example source data 302, the example data transformer 304, the example destination datastore 306, the example metadata monitor 312, the example transformer interface 402, the example pattern monitor 404, the example pattern storage 406, the example analysis storage 408, the example pattern analyzer 410, the example metadata modifier 412, the example data modifier 414 and/or, more generally, the example metadata monitor of FIG. 4 may be implemented by hardware, software, firmware and/or any combination of hardware, software and/or firmware. Thus, for example, any of the example source data 302, the example data transformer 304, the example destination datastore 306, the example metadata monitor 312, the example transformer interface 402, the example pattern monitor 404, the example pattern storage 406, the example analysis storage 408, the example pattern analyzer 410, the example metadata modifier 412, the example data modifier 414 and/or, more generally, the example metadata monitor of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, source data 302, the example data transformer 304, the example destination datastore 306, the example metadata monitor 312, the example transformer interface 402, the example pattern monitor 404, the example pattern storage 406, the example analysis storage 408, the example pattern analyzer 410, the example metadata modifier 412, and/or the example data modifier 414 is/are hereby expressly defined to include a tangible computer readable storage device or storage disk. A tangible computer readable storage device or storage disk may be implemented by a memory, a digital versatile disk (DVD), a compact disk (CD), a Blu-ray disk, etc. storing the software and/or firmware. Further still, the example metadata monitor 312 of FIG. 3 may include one or more elements, processes and/or devices in addition to, or instead of, those illustrated in FIG. 4, and/or may include more than one of any or all of the illustrated elements, processes, and devices.

Flowcharts representative of example machine readable instructions for implementing the metadata monitor 312 of FIG. 3 are shown in FIGS. 5-6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example metadata monitor 312 may alternatively be used. For example, the order of execution of the blocks may be changed, and/or some of the blocks described may be changed, eliminated, or combined.

As mentioned above, the example processes of FIGS. 5-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 5 begins at block 502 when the example transformer interface 402 detects data input(s) passing through the example data transformer 304 to the destination database 308. Alternatively, the example transformer interface may detect any other data inputs or data stored in the example destination database 308. The example pattern monitor 404 compares the data input(s) to field pattern(s) assigned to the field(s) in which the data is inserted/to be inserted (block 504). For example, the pattern monitor 404 may compare a plurality of data inputs to field patterns in parallel or may serially analyze each of the plurality of data inputs. The example pattern monitor 404 determines if a mismatch(es) is detected (block 506). For example, the example pattern monitor 404 determines if a data input does not match a field pattern, set of field patterns, field rule, etc. associated with (as specified in the metadata stored in the metadata repository 310) the field in which the data input is to be stored/is stored. When no mismatch(es) is detected, the program of FIG. 5 ends. Alternatively, before ending, the program of FIG. 5 may increment a counter(s) to indicate that a valid data input(s) was received (e.g., a mismatch was not detected).

When a mismatch(es) is detected (block 506), the example pattern monitor 404 increments a counter(s) stored in the analysis storage 408 (block 508). The example pattern monitor 404 then determines if any error counter(s) meet a threshold (block 510). For example, the threshold may be a threshold number of errors (e.g., 10 errors, 1000 errors, 10000 errors, etc.), an error rate (e.g., the number of mismatches divided by the total number of data inputs analyzed), an error ratio (e.g., the number of mismatches compared to the number of valid data inputs), etc. When the error counter(s) do not meet a threshold, the program of FIG. 5 ends.

When the error counter(s) meet a threshold (block 510), the example pattern monitor 404 initiates a pattern analysis at the example pattern analyzer 410 (block 512). After the pattern analysis, the program of FIG. 5 ends. An example process to perform a pattern analysis is described in conjunction with FIG. 6.

FIG. 6 is a flowchart illustrating example machine readable instructions that may be executed to perform a metadata field pattern analysis (e.g., a process initiated by the example pattern analyzer 410 at block 512 of FIG. 5).

The process of FIG. 6 begins at block 602 when the example pattern analyzer 410 compares data inputs to available field patterns stored in the example pattern storage 406 (block 602). For example, the pattern monitor 404 may store data inputs for analysis in the example analysis storage 408 and may indicate to the pattern analyzer 410 which field(s) has triggered the pattern analysis. Alternatively, when a pattern analysis is triggered, the pattern analyzer 410 may take the opportunity to perform a metadata field pattern analysis on all fields in the example destination database 308.

The example pattern analyzer 410 determines if the analyzed data inputs indicate a shift to a different field pattern (block 604). For example, for a given field in the example destination database 308, the pattern analyzer 410 may determine how many records match each of a plurality of field patterns identified on a list of known field patterns stored in the example pattern storage 406. In some examples, the pattern analyzer 410 determines the number of records that do not match any field pattern (e.g., indicative of records that are in error). The example pattern analyzer 410 may determine that the data inputs indicate a shift to a different field pattern when the analyzed inputs match a new field pattern (e.g., one that is not currently associated with the field) more frequently than match the field pattern currently associated with the field. The analysis may be performed on all of the data stored in a field in the destination database 308, a subset of the data stored in the field in the destination database 308, data inputs received from a particular data source, data inputs received during a particular time frame, etc. The pattern analyzer 410 may utilize a trend analysis, machine learning/artificial intelligence analysis, a statistical analysis, etc.

When the example pattern analyzer 410 does not detect a shift to a different field pattern (block 604), the program of FIG. 6 ends.

When the example pattern analyzer 410 detects a shift to a different field pattern (block 604), the example metadata modifier 412 modifies the metadata stored in the example metadata repository 310 to associate the field with the newly identified field pattern (block 606). According to the illustrated example, the example data modifier 414 also modifies the existing data stored in the destination database 308 to account for the data transition (block 608). For example, the data modifier 414 may process the data stored in the field in the destination database 308 to move data inputs that match the previous field pattern (e.g., the field pattern associated with the field prior to block 606) to a different field. After the example metadata modifier 412 modifies the metadata in the metadata repository 310 and the example data modifier 414 modifies the data in the destination database 308, the program of FIG. 6 ends.

While the examples of FIGS. 5 and 6 illustrate a serial process of analyzing a data input for a field, the processes of FIGS. 5 and 6 may performed in parallel (e.g., may be performed for a plurality of fields and/or data inputs in parallel). For example, the metadata monitor 312 may be implemented by a plurality of threads operating in a multi-threaded processing system to analyze a plurality of data inputs and/or fields (e.g., each field of a particular data input record).

Figure 7:
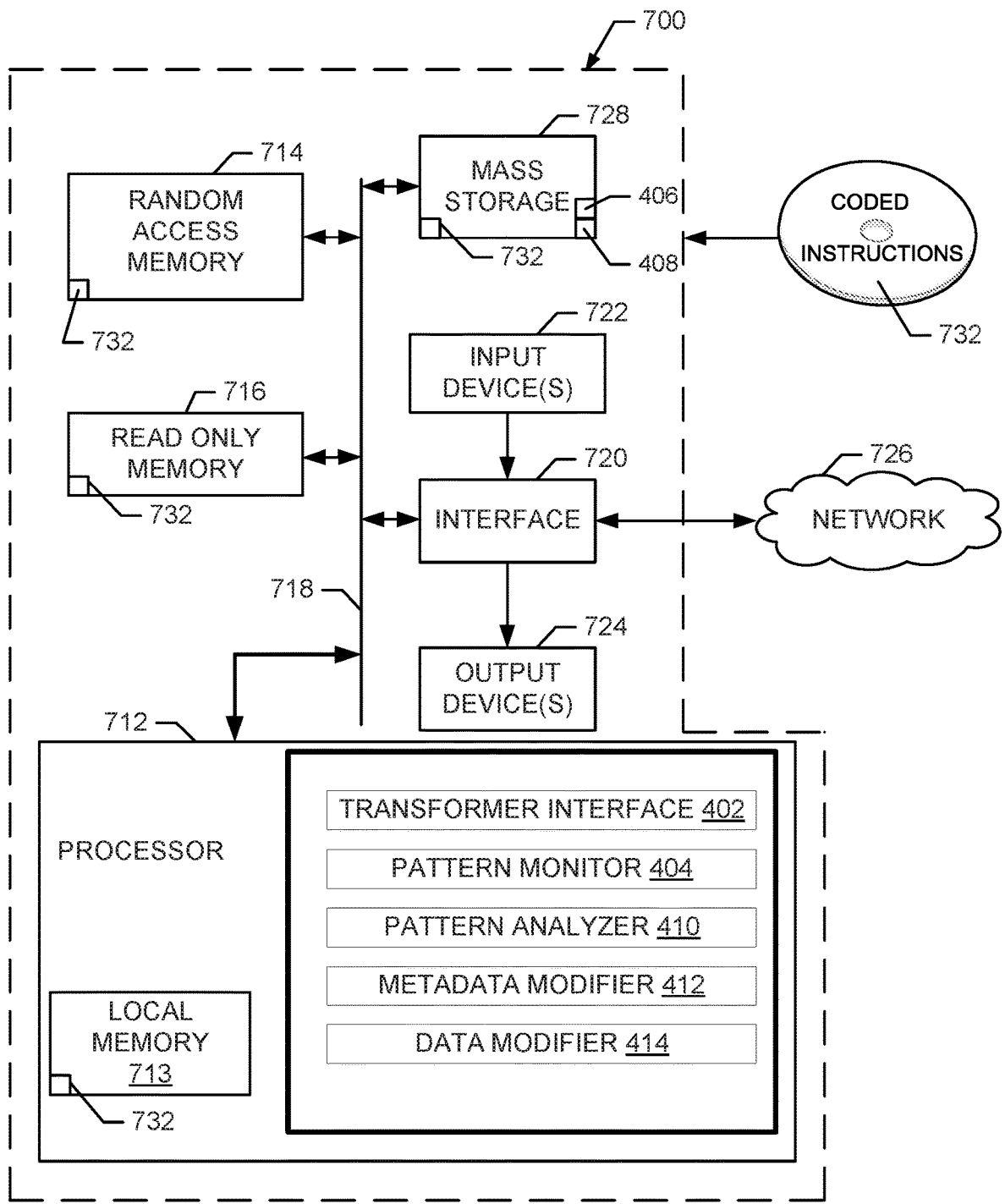
FIG. 7 is a block diagram of an example processor platform structured to execute the example machine readable instructions of FIGS. 5 and 6 to implement the example metadata monitor of FIGS. 3 and/or 4 to monitor metadata for a database.

FIG. 7 is a block diagram of an example processor platform 700 capable of executing the instructions of FIGS. 5 and/or 6 to implement the metadata monitor 312 of FIGS. 3 and/or 4. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The example processor 712 includes the example transformer interface 402, the example pattern monitor 404, the example pattern analyzer 410, the example metadata modifier 412, and the example data modifier 414.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. The example mass storage device 728 includes the example pattern storage 406 and the example analysis storage 408.

The coded instructions 732 of FIGS. 5 and/or 6 may be stored in the mass storage device 728, in the volatile memory 714, in the non-volatile memory 716, and/or on a removable tangible computer readable storage medium such as a CD or DVD.

From the foregoing, it will be appreciated that the above-disclosed methods, apparatus, and articles of manufacture facilitate improved metadata handling for data (e.g., databases). By automatically adjusting metadata, systems that access the data can better understand the contents of the data. Such increased accuracy reduces the amount of processing required to interpret the data. Furthermore, the automatic recognition that data may be transitioning reduces the processing utilized in reporting and handling errors for data that is not actually in error (e.g., data that is a part of a data transition rather than a transient failure to enter valid data).

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage database metadata, the method comprising:
    determining, by executing an instruction with a processor, a first database field pattern assigned to a field of a database, the first database field pattern assigned to the field via metadata for the database;
    counting a number of mismatches between entries in the field and the first database field pattern;
    determining, by executing an instruction with the processor, an error rate based on the number of mismatches; and
    in response to determining that the error rate meets a threshold:
        identifying, by executing an instruction with the processor, a second database field pattern that matches a first subset of the entries in the field; and
        modifying, by executing an instruction with the processor, the metadata to assign the second database field pattern to the field.

2. The method of claim 1, wherein the identifying of the second database field pattern includes identifying the second database field pattern corresponding to a classification of the entries in the field not matching the first database field pattern.

3. The method of claim 1, wherein the modifying of the metadata includes replacing the first database field pattern with the second database field pattern.

4. The method of claim 1, wherein the modifying of the metadata is performed in response to determining that a first rate at which the entries match the second database field pattern exceeds a second rate at which the entries match the first database field pattern.

5. The method of claim 1, wherein the identifying of the second database field pattern includes analyzing the entries with a machine learning classifier.

6. The method of claim 1, wherein the determining of the error rate includes analyzing the entries with a machine learning classifier.

7. The method of claim 1, wherein the first database field pattern is assigned to the field in a metadata repository associated with the database.

8. The method of claim 1, wherein the field is a first field, and wherein the method further comprises, in response to determining that the error rate meets the threshold:
    moving a second subset of the entries that match the first database field pattern to a second field of the database; and
    assigning the first database field pattern to the second field.

9. An apparatus comprising:
    a processor; and
    memory including machine readable instructions that, when executed by the processor, cause the processor to perform operations comprising:
        determining a first database field pattern assigned to a field of a database, the first database field pattern assigned to the field via metadata;
        counting a number of mismatches between entries in the field and the first database field pattern;
        determining an error rate based on the number of mismatches; and
        in response to determining that the error rate meets a threshold:
            identifying a second database field pattern that matches a first subset of the entries in the field; and
            modifying the metadata to assign the second database field pattern to the field.

10. The apparatus of claim 9, wherein the modifying the metadata is performed in response to a first rate at which the entries match the second database field pattern exceeding a second rate at which the entries match the first database field pattern.

11. The apparatus of claim 10, wherein the operations further comprise analyzing the entries with a machine learning classifier to identify the second database field pattern.

12. The apparatus of claim 9, wherein the determining the error rate includes analyzing the entries with a machine learning classifier.

13. The apparatus of claim 9, wherein the first database field pattern is assigned to the field in a metadata repository associated with the database.

14. The apparatus of claim 9, wherein the field is a first field, and wherein the operations further comprise in response to determining that the error rate meets the threshold:

moving a second subset of the entries that match the first database field pattern to a second field of the database; and assigning the first database field pattern to the second field.

15. A tangible machine readable storage medium comprising instructions which, when executed, cause a machine to at least perform operations comprising:

determining a first database field pattern assigned to a field of a database, the first database field pattern assigned to the field via metadata for the database;

counting a number of mismatches between entries in the field and the first database field pattern;

determining an error rate for the field based on the number of mismatches; and in response to determining that the error rate satisfies a threshold:

identifying a second database field pattern that matches a first subset of the entries; and modifying the metadata to assign the second database field pattern to the field.

16. The tangible machine readable storage medium of claim 15, wherein the modifying the metadata is performed in response to a first rate at which the entries match the second database field pattern meeting a second rate at which the entries match the first database field pattern.

17. The tangible machine readable storage medium of claim 15, wherein the identifying of the second database field pattern is performed by analyzing the entries with a machine learning classifier.

18. The tangible machine readable storage medium of claim 15, wherein the determining of the error rate is performed by analyzing the entries with a machine learning classifier.

19. The tangible machine readable storage medium of claim 15, wherein the first database field pattern is assigned to the field in a metadata repository associated with the database.

20. The tangible machine readable storage medium of claim 15, wherein the field is a first field, and the operations further comprise, in response to the error rate satisfying the threshold:

moving a second subset of the entries that matches the first database field pattern to a second field of the database; and assigning the first database field pattern to the second field.

* * * * *